Nov. 19, 1968  J. W. WILLIAMSON ET AL  3,412,317

PHASE BALANCING

Filed Dec. 29, 1965  2 Sheets-Sheet 1

INVENTOR.
James W. Williamson
and Mario Tam

ATTORNEY.

3,412,317
PHASE BALANCING
James W. Williamson, Canfield, and Mario Tama, Cortland, Ohio, assignors to Ajax Magnethermic Corporation, Warren, Ohio, a corporation of Ohio
Filed Dec. 29, 1965, Ser. No. 517,356
32 Claims. (Cl. 321—52)

ABSTRACT OF THE DISCLOSURE

A phase balancing and power regulating circuit wherein a single-phase lagging power factor load is fed from a three-phase source, in addition single-phase variable output voltage is simultaneously applied to a load and to capacitance associated with the load.

---

This invention relates to phase conversion, voltage transformation and power regulation and relates more particularly to a system wherein a single-phase lagging power factor lead is fed from a three-phase source.

The invention is particularly adapted to distributing a single-phase low power factor load, such as an induction melting furnace, induction heater or the like, operating at line frequency, in the three phases of the power supply. Adjustment for impedance changes occurring in such loads and adjustment of power are included within this invention. Where the voltage applied to the single-phase load must be appreciably less than the line-to-line voltage of the three-phase system, this invention includes simultaneous means for phase conversion and voltage reduction.

In certain prior art phase balancers, the load is connected to one phase of a three-phase network and the load is compensated in the two other phases of the three-phase network by means of an inductive, wattless load in one phase and by a capacitive, wattless load in the other said phase. In these prior art phase balancing devices, regulation of the power input to the single-phase load or furnace has been achieved by inserting between the three-phase power supply and the furnace and phase balancing equipment a three-phase regulating transformer or transformer bank, such as shown in Seitz U.S. Letters Patent No. 3,053,920, dated Sept. 11, 1962. The rating of said three-phase regulating transformer must be at least equal to the power rating of the load. Such a transformer requires three variable voltage windings and typically three tap changing switches.

Such devices, to achieve balancing of the line currents at all power levels and over the normal range of load impedance require switching of a portion of the inductive and capacitive wattless loads connected across the other two phases by means of control devices, as shown, for example in Seitz cited above. Such switching and control of the capacitive and inductive wattless loads are costly and add to the complexity of the equipment and they are frequently dispensed with in practice. In that event, the capacitive and wattless load remain connected across the two phases at all times. Under these conditions very substantial unbalance between the three line currents will occur over the range of practical load impedances.

A certain prior art inventor, one of the co-inventors of the present application, viz., J. W. Williamson, proposed, in U.S. Letters Patent No. 3,004,208, dated Oct. 10, 1961, to dispense with compensating wattless loads and with the disadvantages associated therewith by providing a capacitor having a pair of terminals connected between the first and second conductors of a three-phase power system and an autotransformer having a single winding connected between the second and third conductors of the three-phase power source. A single phase load is connected between the first conductor and a tap on the winding of the said transformer. The patent referred to related principally to phase conversion and did not consider the problems arising from regulation of power applied to the load over a wide range and the problems arising from the use of single-phase loads of widely varying impedance characteristics. Wide variants in impedance and voltage do not occur in connection with all applications of induction heating and melting and the like, but occur in many applications, particularly those of recent date, where phase conversion is required. Furthermore, the need for voltage reduction has increased recently, because of the trend toward larger powers, and the consequent desirability of higher input voltages to avoid excessive line currents. Voltages which can be applied to induction heating and melting coils, for example, are limited by the number of turns which can be accommodated and by the limits of safe voltage stresses which can be applied to electrical insulation. Adjustment for single-phase load power factor angle changes, according to the disclosure of U.S. Patent No. 3,004,208, could be accomplished by changing the autotransformer tap 4 position shown in FIGURE 1 of the patent. Since the current carried by this tap is typically nine times the line current, a tap switch or like device of appreciable size and cost would be required for any such adjustment, as suggested in said patent.

It will be noted that the Williamson Letters Patent referred to does not disclosure regulation of voltage applied to the single-phase load for power control.

In the present invention, phase balancing and power regulation are achieved without use of an inductive wattless load in one phase and capacitive wattless load in another phase, as in Seitz. Stepping up or down of single-phase load voltage as compared with line voltage, when desired, is obtained by the use of but two single-phase transformers or in a special modification, a single-phase transformer, in this invention simultaneous with phase conversion.

Regulation of the power input to the single-phase load or furnace is achieved in the present invention by using a single-phase regulating transformer or its equivalents, and such transformer requires only one variable voltage winding and typically only one tap changing switch. Such single-phase regulating transformer or equivalent need only have a rating of substantially less than the power rating of the load, for example, 58% of that rating.

This invention consists in a three-phase system with a lagging power factor, single-phase load, variable voltage applied simultaneously to the load and capacitive means compensating for inductive volt-amperes of the load, and voltage means for effecting a phase angle shift between voltages applied to the load and capacitive means.

By this invention the power is regulated by varying the voltage output of only one single-phase transformer or like device.

In the typical system of this invention, a three-phase source of power is used, a single-phase shifting transformer or autotransformer is connected to the single-phase load, a single-phase regulating transformer, which may be a double wound transformer or autotransformer is used to regulate the power, and capacitive means are associated with the load in such manner that the magnitudes of voltages applied to the load and to said capacitive means are similar, but the phases of these voltages differ at least slightly. The secondary voltage of the regulating transformer may be regulated by tap or other variable means. It is not contemplated that ordinarily the ratio of the phase shifting transformer will be changed during operation of the equipment. However, taps may be provided for close adjustment, in case the single-phase load impedance for which the system is designed differs slightly from the actual single-phase load impedance. Provision of additional taps and tap switches is not precluded, but it often unnecessary for reasons explained below. In one form of this invention, the phase shifting transformer is eliminated.

With the phase conversion, voltage transformation and power regulation of this invention, perfect phase balance may be achieved when maximum power is drawn from the line, with normal single-phase load impedance. Reduction of power by reduction of voltage at fixed load impedance results in some imbalance of line and phase currents, but all these currents will be reduced as compared to their full power values. If the single-phase load power factor increases, tending to unbalance the load on the three-phase system, the voltage adjustment required to bring power absorption back to normal simultaneously aids in bringing the load on the three-phase system back into near balance. An approximately equal further reduction in power makes it possible to restore perfect balance. If the single-phase load power factor decreases, slight unbalance will result but none of the line currents will exceed their values for normal load impedance at the same voltage.

With the apparatus of this invention, it is practical to vary power to the load typically from full power to 5 to 10% of full power. Thus a wide range of power variations is accommodated.

It is an object of this invention to obtain an adequate distribution of line and phase currents in the three phases of a conventional power supply when energizing a single-phase induction furnace load, etc., accommodating impedance changes occurring in such devices, and at the same time providing for variation of power over a wide range.

It is a further object of this invention to provide improved phase conversion where a single-phase lagging power factor load is fed from a three-phase source wherein the power lines, preceding equipment, etc. will not become "overloaded" under abnormal load conditions or reduced voltage settings.

Another object is to combine step-down or step-up of voltage with phase conversion with the same transformers, in a manner which leads to relatively simple, reliable design calculations.

A still further object of the invention is to provide a phase conversion, voltage transformation and power regulation system which is economical to manufacture, simple in construction and composed of but few parts and is highly efficient in use.

Other objects of this invention and the invention itself will become more readily apparent to those skilled in the art to which the invention pertains by referring to the following description of the invention and the accompanying drawings, in which drawings:

FIGURE 7 is otherwise similar to FIGURE 1.

Figure 1:
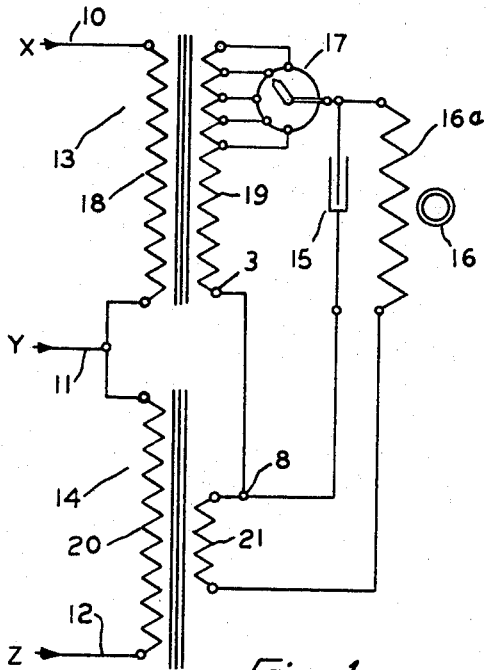
FIGURE 1 is a circuit diagram showing a preferred embodiment of this invention where in the connection of a single-phase inductive load, a regulating transformer and a phase balancing transformer, capacitive means, to a three-phase network is shown.

Referring now to the drawings, in all of which like parts are designated by like reference characters, in said drawings preferred embodiments of the invention are disclosed therein but the invention is not limited by such showing. FIGURE 1 illustrates a preferred phase conversion, voltage transformation and power regulation circuit, circuit elements being shown in a conventional straight line diagram without reference to phase angle, hereinafter more fully discussed. In this figure is shown a three-phase power source connected through lines 10, 11, 12 to the output circuit 16 including a single-phase lagging power factor load, shown as comprising a primary coil 16a and a billet or metal bath forming a single turn secondary as shown by the circle; a single-phase regulating transformer 13, switching means 17 being associated therewith; a single-phase fixed ratio phase shifting transformer 14; capacitive means 15 connected in series with the load through the secondary 21 of the transformer 14; and the regulating transformer connected in parallel with the capacitor.

The regulating transformer 13 may be a double wound transformer, as shown, comprising primary and secondary windings 18 and 19, respectively, or an autotransformer (not shown), depending upon the relationship of supply voltage and furnace voltage. The regulating transformer uses phase X–Y only. The switch 17 operates as a tap changer for regulating the secondary voltage of the transformer 13. Regulating of the secondary voltage of the regulating transformer may also be achieved by use of a special tapped transformer permitting under-load tap changing; or an induction regulator; or, by any other known transformer means with variable ratio. The regulating transformer 13 supplies a voltage of adjustable magnitude in phase with one of the line-to-line voltages of the three-phase system.

The phase shifting transformer uses phase Y–Z only and supplies a voltage of fixed ratio in the form of FIGURE 1 in phase with another line-to-line system.

In the form shown in FIGURE 1, the secondary terminal 3 of the regulating transformer 13 is connected to the secondary terminal 8 of the phase shifting transformer 14. The single-phase load or induction furnace, etc., is connected between the selected tap of the secondary 19 of the regulating transformer 13 and the secondary 21 of the phase shifting transformer 14.

The secondary voltage of the transformer 14 is calculated to give maximum line current phase balancing for a specific load condition or range of changing load conditions at near maximum power. The voltage may be in a range from five to twenty-five percent of the maximum secondary voltage of the regulating transformer 13. Criteria for determining this voltage is given below.

The input line 10 is connected, as shown, to one end of the primary winding 18 of the regulating transformer and input line 11 is connected to an opposite end thereof and to an end of primary winding 20 of the phase shifting transformer 14. Input line 12 is connected to an opposite end of primary winding 20 of the phase shifting transformer.

Figure 2:
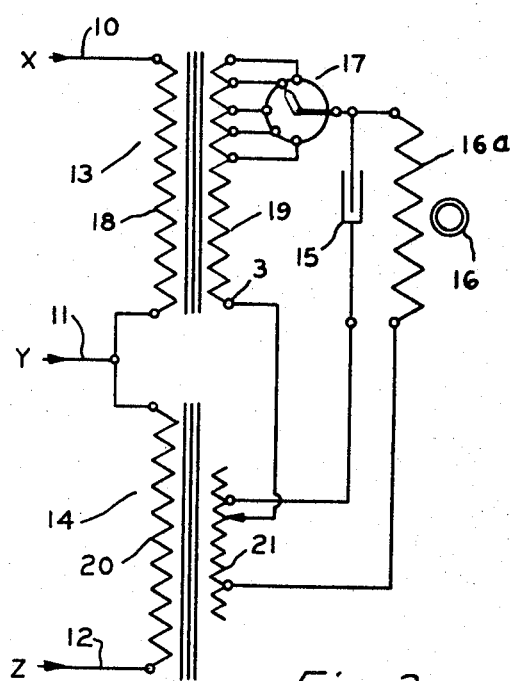
FIGURE 2 is a circuit diagram showing a modification of this invention.

In the circuit of FIGURE 2, the connection of the secondary terminal of the regulating transformer 13 to the secondary of the phase shifting transformer 14 is illustrated as connected to any point on the secondary winding or to any point on the extended winding thereof.

Figure 3:
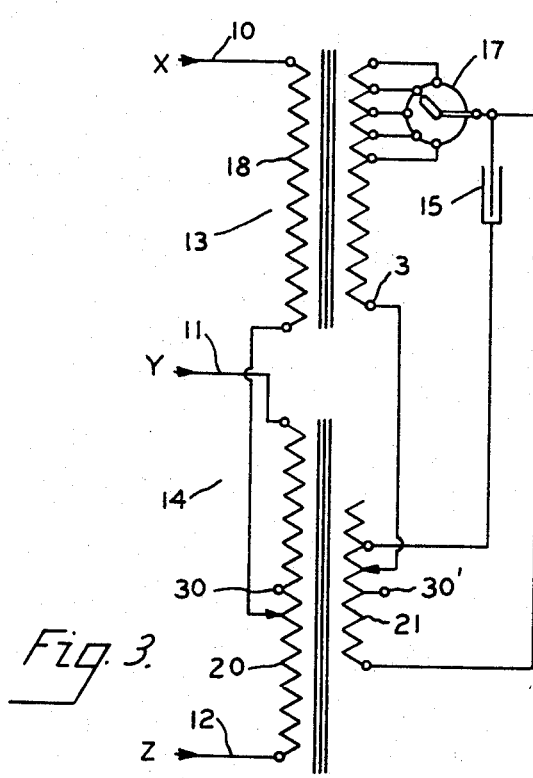
FIGURE 3 is a circuit diagram showing a modification of this invention.

FIGURE 3, illustrates the connection of a terminal of the primary winding 18 of the regulating transformer 13 to an intermediate point of the primary winding 20 of the phase shifting transformer 14 and illustrates the possibility of connecting the same to any point on the said primary 20. If the connection is made to the center (shown at 30) of the primary 20, the primary connection resembles that of conventionally known Scott three phase two phase conversion circuits and the voltages of the transformers 13 and 14 are exactly 90° apart in phase. The point of connection of the secondary 21 with the regulating transformer secondary 19 can be varied as illustrated as the center tap is designated at 30'.

Figure 4:
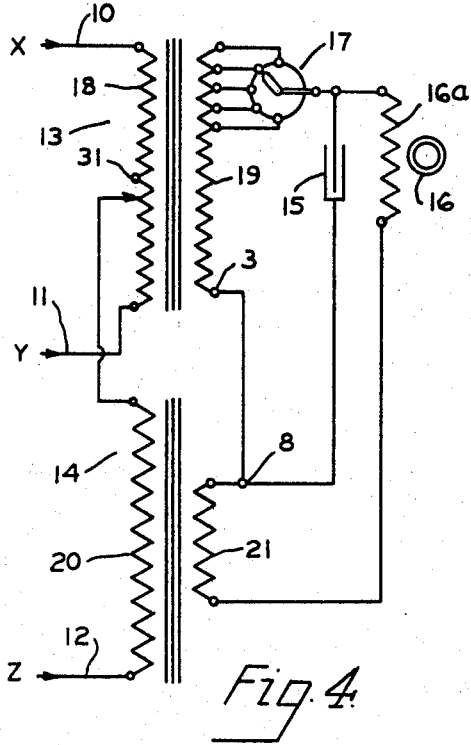
FIGURE 4 is a circuit diagram showing a modification of this invention.

FIGURE 4 illustrates the converse of the connection of the primaries of transformers 13 and 14, shown in FIGURE 3, i.e. the connection is made between a terminal of the primary 20 of the phase shifting transformer 14 and an intermediate point on the primary of the regulating transformer 13. A connection at center, indicated at 31, is similar to connection 30 of primary 20 in FIGURE 3.

Figure 5:
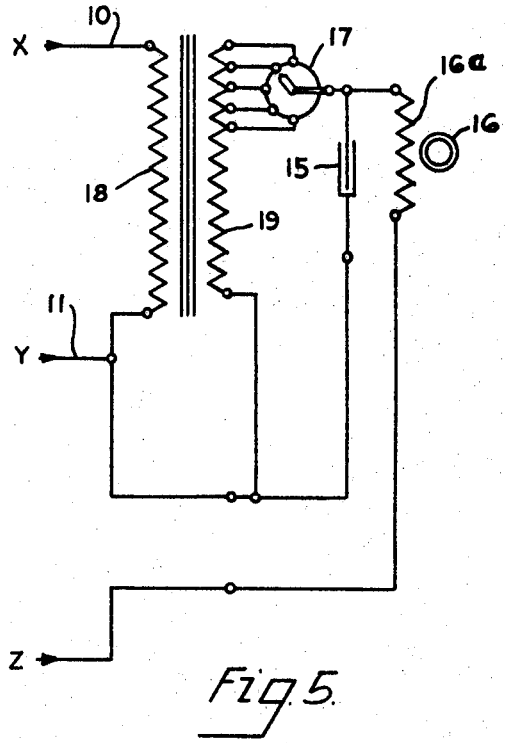
FIGURE 5 is a circuit diagram showing a modification of this invention wherein no phase balancing transformer is employed.

FIGURE 5 illustrates a modification of the invention wherein no phase shifting transformer is used. In circuits of this type, typically, a low voltage supply of 460 volts, three-phase, is connected to line terminals 10, 11, and 12 of the three phases. The regulating transformer would in such case be a step-up transformer, either an autotransformer or a double wound transformer, as shown, with a primary voltage of 460 volts and a maximum secondary voltage of, for example, 4160 volts. Where there is ample low voltage supply, such step up to a considerably higher furnace voltage can reduce the magnitude of currents to be switched in the tap changer 17.

Figure 6:
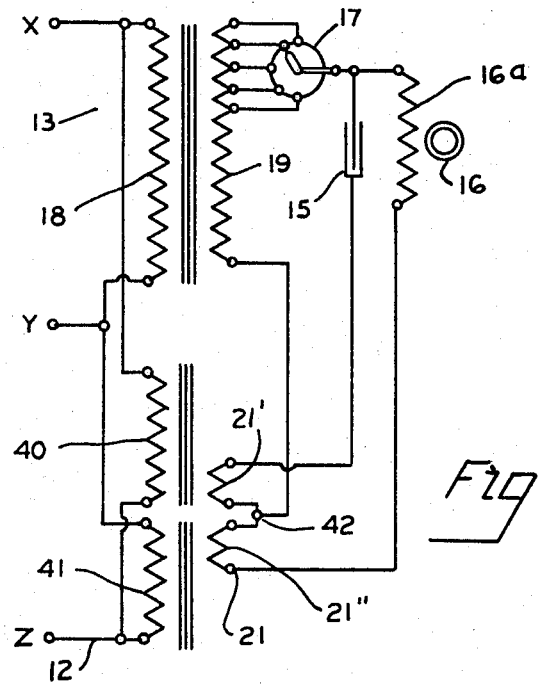
FIGURE 6 is a circuit diagram of a further modification of the invention.

FIGURE 6 is similar to the circuit of FIGURE 5 but in this circuit the phase shifting is effected by a pair of fixed ratio phase shifting double wound transformers 40 and 41, each connected to a separate phase of the three-phase supply, i.e. to phases X–Z and Y–Z, respectively; the secondary voltages of the said pair being a voltage 90° out of phase with X–Y voltage applied to the regulating transformer, the connection of the terminal of the secondary winding 19 of the regulating transformer 13 being to a common center terminal 42 of the secondary windings 21', 21'', the two secondaries being represented together by the character 21.

Figure 7:
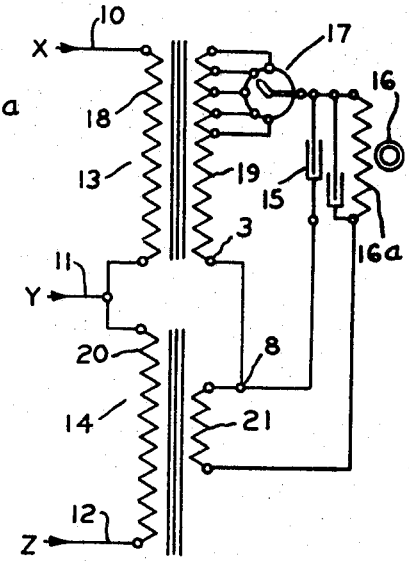
FIGURE 7 is a circuit diagram illustrating the possibility of connecting some capacitors directly in parallel with the power consuming device.

FIGURE 7 is similar to FIGURE 1, except that some of the capacitors are shown connected in parallel relationship with the induction heating or melting coil or like device. It is to be understood that the numeral 16 refers to the total single phase lagging power factor load, comprising the induction furnace etc. and capacitors connected in series or parallel relationship therewith. It is also to be understood that some of the capacitors may be similarly associated with an induction heating or melting furnace coil or the like with arrangements otherwise similar to those shown in FIGURES 2 through 6, and that the term "single phase load" will include such use of capacitors.

In preferred embodiments of the invention, voltages derived from transformers and like devices, energized by the power system, are in relatively constant phase relation with the line-to-line voltages of the power system.

In explaining operation of the phase converter of this invention, voltages and currents are distinguished by subscripts corresponding with letters or numerals on the drawings. Thus, $\underline{E}_{16}$ and $\underline{I}_{16}$ are defined by the statement that projection on the real axis of $\sqrt{2}\underline{E}_{16}$ and $\sqrt{2}\underline{I}_{16}$ equal instantaneous values of applied voltage and current for the output circuit. The downward direction, as shown on the drawings, is taken as positive for the applied instantaneous voltage and instantaneous current thus represented by $\underline{E}_{16}$ and $\underline{I}_{16}$. Similarly, projections on the real axis $\sqrt{2}\underline{E}_{15}$ and $\sqrt{2}\underline{I}_{15}$ equal instantaneous applied voltage and instantaneous current for capacitive means 15. Input "to-neutral" voltages and line currents are correspondingly represented by revolving vectors $\underline{E}_X$, $\underline{E}_Y$, $\underline{E}_Z$ and $\underline{I}_X$, $\underline{I}_Y$, $\underline{I}_Z$. "To-neutral" means to a point of potential equal to average potential of wires 10, 11, and 12.

The prior patent referred to herein to Williamson gives a general relationship for determining circuit arrangements for a balanced load on a three-phase system feeding two single-phase loads. If transformer exciting current and short-circuit impedances are negligible, this relationship can be expressed, in the present notation $$\underline{E}_{16}\underline{I}_{16}+\underline{E}_{15}\underline{I}_{15}=0 \qquad (1)$$

The above equation applies to the phase converter of the present invention at the design point for a balanced load on the three-phase system, normally the condition of maximum single-phase load voltage at normal impedance. Therefore, two design conditions normally result at maximum single-phase load voltage: (1) The product of terminal current and terminal voltage is the same as between load 16 and capacitive means 15. (2) Where $\theta_L$ is the power factor angle of the load, that is, the angle by which $\underline{I}_{16}$ lags $\underline{E}_{16}$, the voltage supplied by phase shifting means 21 is such as to make $$\underline{E}_{16} \text{ lag } \underline{E}_{15} \text{ by } 45°-(\tfrac{1}{2})\theta_L.$$

The above conditions are called "design conditions," since slight adjustments for equalization of line currents may be performed after manufacture and preliminary testing of the phase converter and associated equipment, these adjustments being necessary to compensate for transformer short-circuit impedances, transformer exciting currents, and departure of the actual load impedance from the calculated impedance.

Although the present invention contemplates design conditions listed as (1) and (2) above, usually for normal single-phase load impedance and maximum voltage, the present invention does not contemplate that both of these conditions, and particularly condition (2), should be satisfied for all single-phase load impedances which may occur and for all single-phase load voltages which may occur.

An understanding of the present invention requires a knowledge that unbalance currents, though not eliminated, may be controlled or held within limits which can readily be tolerated in commercial practice.

An understanding of the previous disclosure of Letters Patent No. 3,004,208, reveals that the projection on the real axis of the product of two complex numbers, represented by revolving vectors depicting a voltage and current, gives the time-varying component of instantaneous power. Thus, the projections on the real axis of $\underline{E}_{16}\underline{I}_{16}$ and $\underline{E}_{15}\underline{I}_{15}$ equal the time-varying components of instantaneous power to load 16 and capacitive means 15. Therefore, the total time-varying component of output power equals the projection on the real axis of the complex sum $(\underline{E}_{16}\underline{I}_{16}+\underline{E}_{15}\underline{I}_{15})$. Similarly, the time-varying component of total input power equals the projection on the real axis of $(\underline{E}_X\underline{I}_X+\underline{E}_Y\underline{I}_Y+\underline{E}_Z\underline{I}_Z)$. If, as a reasonable design approximation in most cases, transformer losses and energy storage can be neglected, total instantaneous input power equals total instantaneous output power. This can only be true if time-varying components of input and output power are equal. These conditions can be satisfied at all times if, and only if, $$\underline{E}_X\underline{I}_X+\underline{E}_Y\underline{I}_Y+\underline{E}_Z\underline{I}_Z=\underline{E}_{16}\underline{I}_{16}+\underline{E}_{15}\underline{I}_{15} \qquad (2)$$

Where $j$ is an operator, multiplication by which produces a counterclockwise phase rotation of 90°, let $a$ be defined by $$a=-\tfrac{1}{2}-j(\tfrac{1}{2})\sqrt{3}=\cos(-120°)+j\sin(-120°) \qquad (3)$$

Multiplication by $a$ therefore produces 120° clockwise phase shift without change in magnitude. It is known from the theory of symmetrical components that currents $I_P$ and $I_N$ exist for any possible currents $I_X$, $I_Y$, $I_Z$ of which the vector sum is zero such that $$\underline{I}_X=\underline{I}_P+\underline{I}_N$$
$$\underline{I}_Y=a\underline{I}_P+a^{-1}\underline{I}_N \qquad (4)$$
$$\underline{I}_Z=a^{-1}\underline{I}_P+a\underline{I}_N$$

Since $\underline{E}_Y=a\underline{E}_X$ and $\underline{E}_Z=a^{-1}\underline{E}_X$, the result of substituting the above equations into Equation 2 is $$3\underline{E}_X\underline{I}_N=\underline{E}_{16}\underline{I}_{16}+\underline{E}_{15}\underline{I}_{15} \qquad (5)$$

Now define a vector $\underline{e}_X$ of unit magnitude, revolving in phase with $\underline{E}_X$. Then, $\underline{E}_X\underline{e}_X$ is real and of magnitude equal to the root-mean-square to neutral voltage of phase X (or of the other phases). Hence, where absence of underlines or overlines indicates real, root-mean-square magnitudes, $\underline{E}_X/\underline{e}_X = E_X$. Denote $\underline{I}_N/\underline{e}_X$ by $\overline{I}_N$, etc. Division of Equation 5 by $\overline{e_X}^2$ results in $$3E_X\overline{I}_N = \overline{E}_{16}\overline{I}_{16} + \overline{E}_{15}\overline{I}_{15} \qquad (6)$$

Since $\overline{I}_N = \underline{I}_N/\underline{c}_X$, etc. are stationary, Equation 5 has now been converted to a relation (Equation 6) between fixed vectors.

Now equate magnitudes of both sides of Equation 6. Putting $P_{16}$ for the power to the load $$E_{16}I_{16} = \frac{P_{16}}{\cos\theta_L}$$

If it be assumed that condition (1) above is satisfied, $$E_{15}I_{15} = E_{16}I_{16}$$

Assuming, as is normally the case, that the current through capacitive means 15 leads the voltage by virtually 90°, where $\phi$ is the angle by which $\underline{E}_{15}$ leads $\underline{E}_{16}$ (or $\underline{E}_{15}$ leads $\underline{E}_{16}$), the phase angle between $\underline{E}_{15}\underline{I}_{15}$ and $\underline{E}_{16}\underline{I}_{16}$ is $90° + 2\phi + \theta_L$. Hence, making use of the "Law of Cosines,"

$$3E_XI_X = \frac{P_{16}}{\cos\theta_L}\sqrt{2+2\cos(90°+2\phi+\theta_L)} \qquad (7)$$

From well known trigonometric relations, $$\sqrt{2+2\cos(90°+2\phi+\theta_L)} = 2|\cos(45°+\phi+\theta_L/2)|$$
$$= 2|\sin(45°-\phi-\theta_L/2)|$$

Also, $$\cos\theta_L = \sin(90°-\theta_L) = 2\sin(45°-\theta_L/2)\cos(45°-\theta_L/2)$$

Therefore, Equation 7 can be written $$3E_XI_N = \frac{P_{16}}{\cos(45°-\theta_L/2)}\frac{|\sin(45°-\phi-\theta_L/2)|}{\sin(45°-\theta_L/2)} \qquad (8)$$

Subject to assumptions which have been made, the excess of reactive volt-amperes supplied by capacitive means at 15 over reactive volt-amperes consumed by the output circuit at 16 is $$P_{16}(\sec\theta_L - \tan\theta_L)$$

Therefore, equating the square root of the sum of the squares of watts and reactive volt-amperes input and output, and noting that only the "positive-sequence" component of primary input current contributes to primary input watts and reactive volt-amperes, $$3E_XI_P = P_{16}\sqrt{1+(\sec\theta_L - \tan\theta_L)2}$$

But, from well known trigonometric formulas $$\sqrt{1+(\sec\theta_L - \tan\theta_L)2} = \sqrt{1+\left(\frac{1-\sin\theta_L}{\cos\theta_L}\right)^2}$$
$$= \sqrt{1+\left(\frac{1-\cos(90°-\theta_L)}{\sin(90°-\theta_L)}\right)^2}$$
$$= \sqrt{1+\tan^2(45°-\theta_L/2)}$$
$$= 1/\cos(45°-\theta_L/2)$$

Hence, $$3E_XI_P = \frac{P_{16}}{\cos(45°-\theta_L/2)} \qquad (9)$$

From Equations 8 and 9, the sum of root-mean-square magnitudes of positive-and negative-sequence symmetrical currents is such that $$3E_X(I_N + I_P) = \frac{P_{16}}{\cos(45°-\theta_L/2)}\left(1+\frac{|\sin(45°-\phi-\theta_L/2)|}{\sin(45°-\theta_L/2)}\right)$$

Since "a" has absolute value 1.000, it follows from Equations 4 that none of the three line currents $I_X$, $I_Y$, $I_Z$ can be greater than $(I_N + I_P)$, that is $$I_X \leq I_N + I_P$$
$$I_Y \leq I_N + I_P$$
$$I_Z \leq I_N + I_P$$

Hence, $$\left.\begin{array}{l}I_X\\I_Y\\I_Z\end{array}\right\} \leq \frac{1}{3E_X}\frac{P_{16}}{\cos(45°-\theta_L/2)}\left(1+\frac{|\sin 45°-\phi-\theta_L/2)|}{\sin(45°-\theta_L/2)}\right) \qquad (10)$$

Inequality 10 materially assists in understanding the functioning of this invention, in either a balanced or unbalanced condition of the load drawn from the three-phase system.

It has been assumed that capacitive means at 15 have been so adjusted that the product of volts and amperes equals that for load 16. This condition need not be adhered to with absolute strictness in practice, but it can be very nearly adhered to, since capacitors are generally supplied in relatively small units, which can be added to or removed from the circuit individually, or in groups by means of capacitor contactors. Therefore, this assumption, or condition (1) as stated above, is a reasonable assumption, which does not normally impose unreasonable limitations on the apparatus. Normally, also, reduction of voltage applied to output circuit 16 results in approximately equal or sometimes lesser percentage voltage reduction for capacitor means 15, so maintaining a product of volts and amperes at 15 equal to that at 16 does not require appreciable or in most cases any additional microfards of capacitance as the voltage supplied by transformer 19 is reduced. The circuit of FIGURE 3 with the primary and secondary taps at 30 and 30' and the circuit of FIGURE 6 with equal ratios of transformers 40 and 41 result in equal voltages at 15 and 16. Therefore, not even slight capacitor adjustment is necessary in these forms of this invention to preserve condition (1), on reducing the voltage output or regulating transformer 13, the impedance of output circuit 16 being held constant.

If desired, the power factor or power factor angle of the load can be held constant. This condition may be accomplished by paralleling with the induction heating or melting coil or like device a variable capacitance as shown in FIGURE 7. To hold constant output circuit power factor, that is to fix $\theta_L$, for different loading conditions, paralleled capacitance is usually added with the power consuming device itself, except when this device has maximum power factor. If the voltage at 16 were less than at 15, a certain disadvantage might result in such case, since capacitors are normally commercially available only for certain fixed voltages. Hence, it appears to not to be practically to simultaneously maintain maximum rated voltages on parallel capacitors at both 15 and 16. Thus, the circuits of FIGURE 3 with taps at 30 and 30', and the circuit of FIGURE 6 with equal ratios of transformers 40 and 41, and other circuits included within this invention which maintain equal voltages as between capacitive means 15 and the output circuit 16 have a special advantage if it is desired to maintain constant power factor angle $\theta_L$ of the output circuit. However, these advantages are not always of decisive importance. The circuit of FIGURE 1 applies a voltage to capacitive means 15 equal to the output voltage of regulating transformer 13. Thus, capacitive means 15 and regulating transformer 13 may both conform to standard voltage rating of commercial equipment. Assuming an output circuit power factor of 20% the ratio of voltages as between 15 and 16 is 0.95. Therefore, capacitors rated for maximum regulating transformer output voltage but connected across output circuit 16 will deliver approximately 90% of rated volt-ampere rating.

The condition for a balanced load on the three-phase system (in addition to condition (1)) is that the angle $\phi$ by which the voltage applied to capacitive means 15 leads the voltage applied to load 16 be $45° - (\frac{1}{2})\theta_L$. For this condition, the second term of the right side of inequality 10 vanishes. It is apparent that $I_X$, $I_Y$, $I_Z$ are all equal to the positive-sequence symmetrical current component, which is $$\frac{P_{16}}{3E_X \cos(45° - \theta_L/2)}$$

For a typical output circuit power factor of 20%, cos $(45° - \theta_L/2)$, which represent the power factor of the load on the three-phase system, is equal to 0.995. The power factor is therefore slightly leading, but very close to unity.

It is observed that, for a balanced condition, the phase angle by which the voltage applied to capacitive means 15 leads the voltage applied to the single-phase load is the same as for the disclosure of U.S. Letters Patent No. 3,004,208. However, in the present invention, novel means are added for adjusting this phase angle. In the case of a coreless melting furnace designed for a normal operating power factor of 20% for heating a molten steel charge during a start-up condition, with pieces of carbon steel below Curie temperature within the crucible, let it be assumed that a power factor of 30% is encountered. Under the stated conditions, the furnace would be designed for an angle $\phi = 45° - (\frac{1}{2}) 78.5° = 5.75°$ between capacitor and melting coil voltages. But a balanced load on the three-phase system heating pieces of carbon steel below Curie would require a phase angle $$\phi = 45° - (\frac{1}{2}) 72.5° = 8.75°$$

In this case, reduction of the regulating transformer voltage to approximately $5.75/8.75 = 0.656$ of the inital value would multiply $\phi$ by $8.75/5.75$ and thus restore a balanced load on the three-phase system. Although a reduction in obtainable power is likely to occur with such a reduction on the voltage applied to the single-phase load, the equipment would not be overloaded, nor would excessive currents be drawn from the line. Actually, the line currents would be reduced as compared with a condition of normal single-phase load voltage and full voltage. Therefore, the single-phase load voltage would probably have only to be reduced to about 73%, rather than 66% of its maximum value.

Certain approximations may be applied to inequality 10 such as to make the meaning of this inequality more apparent, a degree of accuracy being maintained which is still sufficient for preliminary design purposes. Before making the approximations, assume that the phase converter was designed for an output circuit of specific power factor angle $\theta_{L,O}$. The phase angle $\phi$ between capacitive means and output circuit voltage when these voltages are maximum may therefore be $$\phi_O = 45° - (\frac{1}{2}) \theta_{L,O}$$

At other voltages, assuming the voltage supplied by phase transformer means 21 to be small, $\phi$ can be approximated by $$\phi = (E_{16,O}/E_{16})\phi_O$$

where $E_{16}$ and $E_{16,O}$ are the actual and maximum voltages at 16.

First assume that the output circuit impedance remains equal to that for which the phase converter was designed. Then it is not necessary to distinguish between $\theta_L$ and $\theta_{L,O}$. $\phi_O = 45° - (\frac{1}{2})\theta_L$. The actual output power is $$P_{16} = P_{16,O}(E_{16}/E_{16,O})^2$$

Assuming the angles $(45° - \phi - \theta_L/2)$ and $(45° - \theta_L/2)$ to remain small, the second term of inequality 10 may be approximated by $$\frac{|\sin(45° - \phi - \theta_L/2)|}{\sin(45° - \theta_L/2)} = \frac{\phi - \phi_O}{\phi_O}$$

$$= \frac{\phi}{\phi_O} - 1$$

$$= \frac{E_{16,O}}{E_{16}} - 1$$

Substituting the above approximations into inequality 10, and designating values of $I_X$, $I_Y$, $I_Z$ for maximum output circuit voltages by $I_{X,O}$, $I_{Y,O}$, $I_{Z,O}$ one finds that $$\left.\begin{array}{l}\frac{I_X}{I_{X,O}} \\ \frac{I_Y}{I_{Y,O}} \\ \frac{I_Z}{I_{Z,O}}\end{array}\right\} \leq \frac{E_{16}}{E_{16,O}}$$

Therefore, not only do the three line currents decrease with decreasing single-phase load voltage, they decrease at, at least the same percentage rate as the single-phase load voltage itself.

Now assume a change in the power factor angle $\theta_L$ of the output circuit. It has already been shown that the load or the three-phase system may be brought back into balance after a decrease in $\theta_L$ by reduction of the voltage on the single-phase load. But it is also possible that phase angle $\theta_L$ should increase. If the phase converter is designed for an output circuit power factor angle $\theta_{L,O}$ and is operated at maximum voltage, $\phi$ is expressed by $45° - \theta_{L,O}/2$. Since this angle is small, and $45° - \theta_L/2$ is also small, inequality 10 is approximately equivalent to $$\left.\begin{array}{l}I_X \\ I_Y \\ I_Z\end{array}\right\} \leq \frac{P_{16}}{3E_X \cos(45° - \theta_L/2)}\left(1 + \frac{\theta_L/2 - \theta_{L,O}/2}{45° - \theta_L/2}\right)$$

$$\left.\begin{array}{l}\\ I_Z\end{array}\right\} \leq \frac{P_{16}}{3E_X \cos(45° - \theta_L/2)}\left(\frac{45° - \theta_{L,O}/2}{45° - \theta_L/2}\right)$$

If, now, a constant magnitude of output circuit impedance is assumed with variable, small power factor, $$P_{16} = \frac{45° - \theta_L/2}{45° - \theta_{L,O}/2} P_{16,O}$$

Hence, the above inequality reduces simply to $$\left.\begin{array}{l}I_X \\ I_Y \\ I_Z\end{array}\right\} \leq \frac{P_{16,O}}{3E_X \cos(45° - \theta_L/2)}$$

Hence, at full voltage, the three line currents do not exceed values for the same magnitude of output circuit impedance but normal power factor angle.

It is further apparent from inequality 10 that increases in line currents will not result from reduction of voltage applied to the output circuit, the reduction in $P_{16}$ being relatively more rapid than the increase of the final factor.

Therefore, increases in line currents $I_X$, $I_Y$, $I_Z$ are not caused by increased output circuit power factor angle and reduced output circuit voltage in combination.

It is to be noted that in all forms of this invention illustrated herein a tapped regulating transformer is provided to permit adjusting the power delivered to the furnace. Adjustment of this transformer may be manual or automatic. Automatic switching of capacitive means at 15 may be obtained by sensing and comparing currents in lines 10 and 11; similarly, capacitor switching to maintain a load power factor corresponding exactly with the ratio of the phase shifting transformer or voltage supplied by phase shifting means may be accomplished by comparing the average current in lines 10 and 11 with current in line 12 and switching capacitors when the average current differs appreciably from the current in line 12.

In the absence of capacitors paralled with the power consuming device, assumed, for example, an induction heating or melting coil, the current in line 12 bears a relationship with the current in this coil determined by the turns ratio of transformer 14. Also, the current in line 12 may be said to be in phase with the coil current, and hence to shift relative to its to-neutral voltage by only the same number of degrees as the coil current shifts relative to the coil voltage. Therefore, the current through line 12 is relatively stable and not affected by the adjustment of capacitive means at 15. In those embodiments of the invention where the voltage applied to capacitive means 15 is in phase with one of the line-to-line voltages of the power system, as in FIGURES 1, 5, and 7, that is phase XY as shown in those figures, adjustment of capacitive means at 15 affects only the components of currents in lines 10 and 11 which are in quadrature with the voltage between X and Y. Any desired ratio between these quadrature components may be obtained, as, for example, they may be made equal.

Certain special advantages of the invention apply to its use in coreless induction heating and melting. Typical dimensional changes encountered for coreless induction heating and melting applications include insertion into the coil of a billet of smaller diameter than that for which the coil was designed in induction heating, and a crucible only partially filled with molten metal in induction melting. In each of these examples, both the inductive and power components of coil current are reduced as compared with a billet of maximum size or a full crucible. Since both components of current are reduced, the effects on load power factor and load power factor angle are less than would be anticipated from the change in power component of current alone. As only power or power factor angles, and not changes in current magnitude, cannot be completely compensated by adjustment of capacitive means at 15, imbalance among the three line currents tends to be minimized.

A condition frequently encountered in induction melting practice is that erosion by the bath causes average crucible wall thickness to be multiplied by a factor $k$, less than 1.000. Let it be assumed that the load 16 consists exclusively of the coil, with no capacitors connected in series or parallel relationship therewith. To a first approximation, multiplication of the effective crucible wall thickness by $k$ multiplies the coil impedance and reactance by $k$, wtihout change in the resistance. To regain normal power absorption the coil voltage must be multiplied by $k$. Such multiplication multiplies the phase angle between coil and capacitive means voltage by nearly $1/k$. But the reactance change caused by the reduction in wall thickness is such as to multiply the difference between 90° and the load power factor angle by approximately $1/k$. Therefore, as is apparent from the above analysis, the adjustment of transformer 13 in this manner which regains normal power absorption causes near balance in the three line currents.

Other embodiments of this invention will occur to those skilled in the art to which it pertains. It is clear, for example that in an induction heating or melting coil use, the load 16 could be comprised of seriesed or parallel sections. If comprised of two seriesed sections, phase shifting means 21 could be connected therebetween, or between the upper load terminal as shown on the drawings and transformer 13. Phase shifting means 21 could likewise be comprised of several secondary coils, not directly electrically connected to one another, but so connected at different points as to produce a phase shift between the total voltages applied to the load 16 and capacitive means 15. Such arrangements are considered to be equivalent constructions to those shown.

In all forms of this invention, it is to be noted that there are means for deriving a single-phase, adjustable voltage, and a second voltage, differing in phase, from a plural phase power supply; electrical connections which result in voltages applied to a single-phase load of lagging power factor and to capacitive means compensating for inductive volt-amperes of the load simultaneously increasing or decreasing as the adjustable voltage is varied; and means for producing phase shift between the voltage applied to the load and the voltage applied to the capacitive means.

What is claimed is:

1. Apparatus for supplying a single-phase lagging power factor load from a three-phase power supply, comprising a single-phase transformer supplying a variable single-phase output voltage which is derived from the three-phase power supply, capacitive means associated with said load, means for simultaneously applying said variable single-phase output voltage to said load and to said capacitive means, means for supplying a second voltage differing in phase from said three-phase power supply to produce a phase angle between the voltages of said capacitance and said single-phase load.

2. Apparatus of the type claimed in claim 1, wherein the voltages applied to said single-phase, lagging power factor load and said capacitive means remain equal to one another as said single-phase output voltage is varied.

3. Apparatus of the type claimed in claim 1, wherein the variable single-phase output voltage is in substantially fixed phase relationship to the said second voltage.

4. Apparatus of the type claimed in claim 1 in which the said second voltage is substantially constant.

5. Apparatus as claimed in claim 1, in which the single-phase transformer is connected to one phase of the three-phase supply, and said second voltage is in phase with another phase of the three-phase supply.

6. Apparatus of the type claimed in claim 1, wherein the product of voltage and current for said capacitance means substantially equals the product of voltage and current for said load, and where at maximum value of said variable single-phase output voltage, the phase angle between the voltage of said load and said capacitive means substantially equals 45° reduced by half the power factor angle of said load.

7. Apparatus of claim 1 wherein said single-phase transformer is connected between two lines of the three-phase power supply and said second-named voltage is obtained from the secondary winding of a second single-phase transformer connected between the third line of said power supply and a tap on the primary winding of said first-named single-phase transformer.

8. A phase converter of claim 7 wherein said single-phase transformer is connected between one line of the three-phase power supply and a point on the primary winding of a second single-phase transformer and said second single-phase transformer is connected between the other two lines of the said three-phase power supply.

9. Apparatus as claimed in claim 1, wherein said single-phase lagging power factor load includes capacitive means partially compensating for its inductive volt-amperes.

10. Apparatus as claimed in claim 1, wherein said single-phase lagging power factor load includes an induction heating furnace.

11. A three-phase power system for supplying a single-phase lagging power factor load, capacitive means compensating for inductive volt-amperes of said load, means for applying simultaneously variable voltage to the load and to the capacitive means, means for applying a second voltage providing a difference in phase angle between the voltage of the load and the voltage of the said capacitive means, the said first variable voltage having a substantial phase angle with said second voltage, both voltages being derived from the said three-phase power supply.

12. Apparatus of the type claimed in claim 11, comprising means wherein the voltages applied to said single-phase lagging power factor load and said capacitive means remain equal to one another as said single-phase output voltage is varied.

13. Apparatus of the type claimed in claim 11, wherein the said means for applying variable voltage includes a transformer or like device, the voltage derived from which is in substantially fixed phase relationship to the voltages of the three-phase power supply.

14. Apparatus of the type claimed in claim 11, in which the said second voltage is substantially constant.

15. Apparatus as claimed in claim 11, in which the means for applying variable voltage includes a transformer or like device connected between two line of the three-phase supply and said second voltage is in phase with another phase of the three-phase supply.

16. Apparatus as claimed in claim 11, wherein the product of voltage and current for said capacitive means substantially equals the product of voltage and current for said load, and where at maximum value of said variable single-phase output voltage, the phase angle between the voltage of said load and said capacitive means substantially equals 45° reduced by half the power factor angle of the said load.

17. Apparatus as claimed in claim 11, wherein the means for applying variable voltage includes a transformer or like device connected between two lines of the three-phase power supply and said means for applying said second voltage is obtained from the secondary winding of a second single-phase transformer connected between the third line of said power supply and a tap on the primary winding of said first-named single-phase transformer.

18. Apparatus as claimed in claim 11, wherein the means for applying variable voltage includes a single-phase transformer connected between one line of the three-phase power supply and a point on the primary winding of a second single-phase transformer and said second single-phase transformer is connected between the other two line of the said three-phase power supply.

19. Apparatus of the type claimed in claim 11, wherein said single-phase lagging power factor load includes capacitive means partially compensating for its inductive volt-amperes.

20. Apparatus of the type claimed in claim 11, wherein said single-phase lagging power factor load includes the power consuming device itself, for example, induction heating coil, and capacitors connected in series or parallel therewith.

21. Apparatus for supplying a single-phase lagging power factor load comprising a single-phase power regulating transformer deriving its input voltage from a three-phase power supply and simultaneously supplying a variable output voltage to said load and to capacitive means associated with said load, a second single-phase transformer deriving its input voltage from said three-phase power supply and delivering output voltage to the said capacitive means and the said load to produce a phase angle between the voltage of the said load and said capacitive means.

22. Apparatus of the type claimed in claim 21, wherein the voltages applied to said single-phase, lagging power factor load and said capacitive means remain equal to one another as said single-phase output voltage is varied.

23. Apparatus of the type claimed in claim 21, wherein the variable single-phase output voltage is in substantially fixed phase relationship to the voltages of the three phase power supply.

24. Apparatus of the type claimed in claim 21, in which the said second-named output voltage is substantially constant.

25. Apparatus as claimed in claim 21, in which the first-named single-phase transformer is connected to one phase of the three-phase supply, the said second-named single-phase transformer is connected to another phase of the three-phase power supply and said second-named output voltage is in phase therewith.

26. Apparatus of claim 21, wherein the product of voltage and current for said capacitive means substantially equals the product of voltage and current for said load, and where at maximum value of said variable single-phase output voltage, the phase angle between the voltage of said load and said capacitive means substantially equals 45° reduced by half the power factor angle of said load.

27. A phase converter of claim 21, wherein said first single-phase transformer is connected between two lines of the three-phase power supply and said second-named single-phase transformer is connected between the third line of said power supply and a tap on the primary winding of said first-named single-phase transformer.

28. Apparatus of claim 21 wherein said second-named output voltage is obtained from secondary winding terminals having therebetween a center tap of a transformer connected between two lines of a three-phase power supply, and said first-named output voltage is obtained from the secondary winding having one terminal connected to said center tap of a transformer connected between a center tap on the primary winding of said first-named transformer and the third line of the three-phase power system.

29. Apparatus of claim 21 wherein the said second transformer comprises two transformers connected, respectively, to the line-to-line voltages of the power system to which the single-phase transformer supplying a variable output voltage is not connected.

30. Apparatus of claim 5 wherein the voltage producing phase angle between the voltages of said capacitive means and said single-phase load is one of the two line-to-line voltages of the three-phase power system to which the variable transformer is not connected.

31. Apparatus of the type claimed in claim 21, wherein said single-phase lagging power factor load includes capacitive means partially compensating for its inductive volt-amperes.

32. Apparatus of the type claimed in claim 21, wherein said single-phase lagging power factor load includes the power consuming device itself, for example, induction heating coil, and capacitors connected in series or parallel therewith.

References Cited

UNITED STATES PATENTS

| | | | |
|---|---|---|---|
| 2,883,614 | 4/1959 | Ehret | 323—120 X |
| 3,004,208 | 10/1961 | Williamson | 321—57 |
| 3,053,920 | 9/1962 | Seitz | 13—26 |
| 3,271,659 | 9/1966 | Philips | 336—70 X |

LEE T. HIX, *Primary Examiner.*

G. GOLDBERG, *Assistant Examiner.*

UNITED STATES PATENT OFFICE
CERTIFICATE OF CORRECTION

Patent No. 3,412,317                                November 19, 1968

James W. Williamson et al.

It is certified that error appears in the above identified patent and that said Letters Patent are hereby corrected as shown below:

Column 6, line 63, "$I_P$" should read -- $\underline{I}_P$ --; line 64, "$I_N$" and "$I_X$, $I_Y$, $I_Z$" should read -- $\underline{I}_N$ -- and -- $\underline{I}_X$, $\underline{I}_Y$, $\underline{I}_Z$ --. line 75, "$E_X e_X$" should read -- $\underline{E}_X/\underline{e}_X$ --. Column 7, line 23, "$\underline{E}_{15}$ leads $\underline{E}_{16}$" should read -- $\overline{E}_{15}$ leads $\overline{E}_{16}$ --; line 24, "$\underline{E}_{15}\underline{I}_{15}$ and $\underline{E}_{16}\underline{I}_{16}$" should read -- $\overline{E}_{15}\overline{I}_{15}$ and $\overline{E}_{16}\overline{I}_{16}$ ---.

Signed and sealed this 10th day of March 1970.

(SEAL)
Attest:

Edward M. Fletcher, Jr.                          WILLIAM E. SCHUYLER, JR.
Attesting Officer                                      Commissioner of Patents